Sept. 5, 1933.  H. SCHMARGE  1,925,342
EMERGENCY AIR BRAKE
Filed Aug. 23, 1929
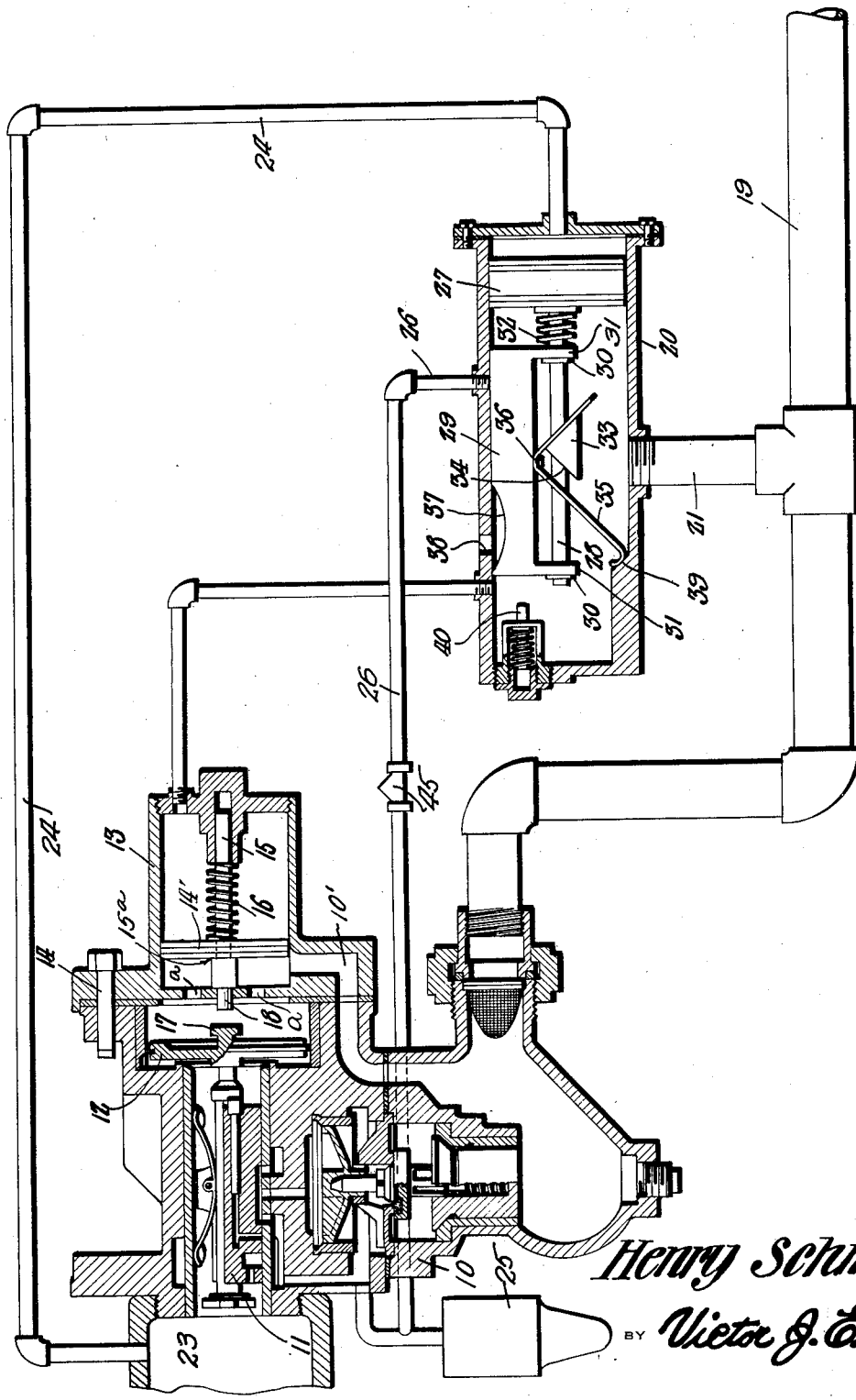
Henry Schmarge, INVENTOR
BY Victor J. Evans ATTORNEY Patented Sept. 5, 1933

1,925,342

UNITED STATES PATENT OFFICE 1,925,342

EMERGENCY AIR BRAKE

Henry Schmarge, Roswell, N. Mex.

Application August 23, 1929. Serial No. 387,945

6 Claims. (Cl. 303—43)

This invention relates to air brake systems and has particular relation to a quick emergency control for air brakes such as is disclosed in my prior Patents #1,577,424 and #1,541,663.

The first mentioned patent is directed to an automatic graduating control which may be applied to air brake equipment to eliminate undesired emergency action in triple valves, yet permit quick action without inertia or delay when such quick action is desired.

With the present air brake equipment, no emergency application of the brakes can be had after the triple valve has been moved to service position, as the triple valve piston must exert a sharp blow upon the graduating valve to move the latter against the action of the graduating spring, so as to obtain an emergency application of the brakes.

The present invention provides means to overcome this disadvantage, and permits the piston of the triple valve to move to emergency position even after the triple valve has been moved to its full service position.

With the above and other objects in view, the invention further includes the following novel features and details of construction, to be hereinafter more fully described, illustrated in the accompanying drawing, and pointed out in the appended claims.

In the drawing the figure shown is a sectional view illustrating the invention.

Referring to the drawing in detail wherein like characters of reference denote corresponding parts, the reference character 10 indicates a triple valve, such as is commonly employed in air brake systems, the slide valve of which is indicated at 11. The piston of the triple valve is indicated at 12, and in my before mentioned Patent #1,577,424, an auxiliary cylinder 13 is secured to the triple valve as indicated at 14. This auxiliary cylinder accommodates a piston 14' which fits loosely upon a stem 15, while a spring 16 surrounds this stem and acts to yieldingly resist movement of the piston in one direction and resist movement of the piston away from the shoulder 15a of the stem. The shoulder prevents movement of the piston 14' past the passage 10' of the triple valve and therefore it cannot block this passage or the openings a formed through the partition at the inner end of the auxiliary cylinder. It is the duty of spring 16 to move and hold piston 14' in position until of course, an emergency application is desired and the air is released from cylinder 13 by the emergency valve. When the brakes are released after an emergency application the valve 29 and piston 27 return to their normal position by air entering emergency valve behind piston 27 forcing piston 27 to the end of the cylinder, thereby establishing communication between pipes 21 and 22 through the cylinder 20 and permitting air to charge cylinder 13.

The piston 12 carries an extension 17 which is adapted to engage an extension 18 of the stem 15, and when the triple valve is in full service position, the extension 18 will be engaged by the extension 17. When an emergency application of the brakes is desired, the extension 17 will strike the extension 18 of the stem 15 a sharp blow and overcome the action of the spring 16 and air trapped in the outer portion of the cylinder 13 to effect a quick application of the brakes. This action cannot take place when a triple valve of a conventional construction has been moved to full service position as a sharp blow cannot then be delivered upon the stem.

The present invention overcomes this disadvantage by providing means which is controlled by a rapid fall of pressure in the brake pipe or train line 19 to exhaust air from the auxiliary cylinder 13 so as to permit of a quick movement of the piston 14' and consequently a quick application of the brakes even after the triple valve piston 12 has been moved to its full service position. For this purpose the invention employs an emergency release cylinder 20 which is in communication with the train line 19 by means of a pipe 21. This cylinder 20 is also in communication in the auxiliary cylinder 13 by means of the pipe 22. The cylinder 20 is also in communication with the auxiliary reservoir 23 through a pipe 24, while the brake cylinder 25 is in communication with the cylinder 20 through a pipe at 26.

Operating within the cylinder 20 is a piston 27 which is positioned between the auxiliary reservoir and the brake cylinder and between the auxiliary reservoir and the train line communication with the cylinder 20. The piston 27 carries a rod 28 and mounted upon this rod is a slide valve 29. Spaced shoulders or collars 30 are provided upon the rod 28 so as to engage lateral extensions 31 which form a part of the slide valve. A spring 32 is interposed between the piston and one of the extensions of the slide valve.

Fast upon the rod 28 is an abutment element 33 which is provided with oppositely extending inclined shoulders 34. This abutment is positioned between oppositely inclined resilient arms 35 which are pivotally secured to the slide valve as shown at 36 and which are provided with openings for the passage of the rod 28. The slide valve 20 is provided with a recess 37 in the face which engages the cylinder 20 and the latter is provided with an escape port 38 which is spaced from the pipe 22.

Should the triple valve 10 be moved to a full service position and the necessity arise for an emergency application of the brakes, the sudden lowering of pressure in the train line 19 will relieve train line pressure from one side of the piston 27, whereupon pressure from the auxiliary reservoir 23 will act to force the piston 27 away from the end of the emergency release cylinder. Initial movement of the piston 27 will compress the spring 32, and consequent movement of the rod 28 will move the abutment 33 toward the long arm 35. The outer end of the arm 35 is engaged by a shoulder 39 provided within the cylinder 20. This engagement will act to hold the slide valve 29 against movement until the abutment 33 engages this long arm, whereupon the slide valve will be moved beyond the inner end of the pipe 22. The recess 37 in the valve 29 will thus provide communication between the pipe 22 and the port 38, so that pressure within the auxiliary cylinder 13 will be relieved and the slide valve 11 of the triple valve may then move to emergency position. Movement of the slide valve 29 as thus described will uncover the inner end of the pipe 26, so that pressure from the brake line may pass through the emergency release cylinder into the brake cylinder past the check valve 45 in the pipe 26.

Movement of the slide valve 29 will be resisted by a spring influenced plunger 40 which is located at one end of the cylinder 20, and as soon as train line pressure has been again built up to equalize pressure upon opposite sides of the piston 27, this spring influenced plunger will act to initially move the slide valve so that the latter will resume its normal position. Communication between the train line and the cylinder 13 will be again established so that pressure will be built up behind the piston 14 and communication cut off with the brake cylinder 25.

When this device is in use it is installed as shown with the train pipe attached to the triple valve in its usual position and the emergency valve cylinder 20 connected with the train pipe by the pipe 21. The pipes 22 and 24 connect opposite end portions of the cylinder 20 with the auxiliary cylinder 13 and auxiliary reservoir 23, and the pipe 26 establishes communication between the cylinder 20 and car brake cylinder 25. Service application of the brakes is carried out in the usual manner and in such application the slide valve 11 and piston 12 move until the extension 17 engages the extended end 18 of the stem 15. An emergency application of the brakes can also be executed in the usual manner. As previously explained, an emergency application cannot be accomplished after a service application when a triple valve of a conventional construction is in use as a stem engaged by a strong spring corresponding to the spring 16 cannot be moved unless struck by a sharp blow and such a blow cannot be delivered when the slide valve 11 is in a service position and the piston disposed close to the inner end of the stem. The improved device overcomes this objection and permits emergency application of the brakes if the occasion arises after service application as movement of the control to an emergency applying position will cause air to enter the cylinder through the pipe 24 and force the piston 27 inwardly until the block 33 swings the latch out of engagement with the shoulder 39 and the valve 29 is then moved into position to establish communication between the pipe 22 and port 38. This permits air to escape from the cylinder 13 and as the spring 16 is a light spring, auxiliary air behind piston 12 shoves piston 14' to retreat and compresses spring 16 and valve 11 is then moved to a position for emergency application of the brakes. As the piston 14' is spaced from the inner end of the auxiliary cylinder a sufficient distance to clear the passage 10', air can pass freely through the ports a into and out of the chamber in which the piston 12 moves. When the brakes are released after an emergency application the valve 29 and piston 27 return to their normal positions and air enters cylinder 13, as heretofore explained, to again establish even pressure upon opposite sides of the piston and this piston will be held in a normal position and the stem will serve to limit movement of the slide valve during service application of the brakes.

Having described the invention what is claimed is:—

1. In an air brake system, a triple valve, a main pipe line for supplying air under pressure to the valve, means secured to the valve to prevent accidental emergency operation of said valve, and means in communication with the pipe line and with the auxiliary reservoir and brake cylinder to provide for an emergency application of the brakes after the triple valve has been moved to service position.

2. In an air brake system, a triple valve, a main pipe line for supplying air under pressure to the valve, means secured to the valve to prevent accidental emergency operation of said valve, and means in communication with the pipe line and with the auxiliary reservoir and brake cylinder to provide for an emergency application of the brakes after the triple valve has been moved to service position and to provide communication between the pipe line and brake cylinder when the emergency brake actuating means is active.

3. In an air brake system, a triple valve, a main pipe line for supplying air under pressure to the valve, an auxiliary piston and cylinder arranged to provide a stop for the triple valve piston when the latter is moved to service position, spring means to resist further movement of the auxiliary piston after service position has been reached, an emergency release cylinder in communication with the auxiliary cylinder and train pipe line to supply train line pressure to the auxiliary piston, and means to bleed the auxiliary cylinder and cut off train line pressure when pressure in the train line is suddenly reduced.

4. In an air brake system, a triple valve, a main pipe line for supplying air under pressure to the valve, an auxiliary piston and cylinder arranged to provide a stop for the triple valve piston when the latter is moved to service position, spring means to resist further movement of the auxiliary piston after service position has been reached, an emergency release cylinder in communication with the auxiliary cylinder and train pipe line to supply train line pressure to the auxiliary valve, means providing communication between the auxiliary cylinder and the emergency release cylinder, a piston operating within the emergency release cylinder between the points of communication of the train line and auxiliary reservoir with said cylinder, a valve within the emergency release cylinder and normally positioned to permit air from the train line to enter the auxiliary cylinder and resist movement of the auxiliary piston, and means controlled by the valve of the emergency release cylinder to exhaust air from the auxiliary cylinder when train line pressure is reduced upon one side of the emergency release piston and the latter moved by the auxiliary reservoir pressure.

5. In an air brake system, a triple valve, a main pipe line for supplying air under pressure to the valve, an auxiliary piston and cylinder arranged to provide a stop for the triple valve piston when the latter is moved to service position, spring means to resist further movement of the auxiliary piston after service position has been reached, an emergency release cylinder in communication with the auxiliary cylinder and train pipe line to supply train line pressure to the auxiliary piston, means providing communication between the auxiliary cylinder and the emergency release cylinder, a piston operating within the emergency release cylinder between the points of communication of the train line and auxiliary reservoir with said cylinder, a valve within the emergency release cylinder and normally positioned to permit air from the train line to enter the auxiliary cylinder and resist movement of the auxiliary piston, and means controlled by the valve of the emergency release cylinder to exhaust air from the auxiliary cylinder when train line pressure is reduced upon one side of the emergency release piston and the latter moved by the auxiliary reservoir pressure and yieldable means to resist movement of the emergency release piston.

6. In a air brake system, a triple valve, a main pipe line for supplying air under pressure to the valve, an auxiliary piston arranged to provide a stop for the triple valve piston when the latter is moved to service position, spring means to resist further movement of the auxiliary piston after service position has been reached, an emergency release cylinder in communication with the auxiliary cylinder and train pipe line to supply train line pressure to the auxiliary valve, means providing communication between the auxiliary cylinder and the emergency release cylinder, a piston operating within the emergency release cylinder between the points of communication of the train line and auxiliary reservoir with said cylinder, a valve within the emergency release cylinder and normally positioned to permit air from the train line to enter the auxiliary cylinder and resist movement of the auxiliary piston, and means controlled by the valve of the emergency release cylinder to exhaust air from the auxiliary cylinder when train line pressure is reduced upon one side of the emergency release piston and the latter moved by the auxiliary reservoir pressure, yieldable means to resist movement of the emergency release piston, and means controlled by the emergency release valve to direct train line pressure to the brake cylinder when the auxiliary piston is released.

HENRY SCHMARGE.